United States Patent Office 2,739,948
Patented Mar. 27, 1956

2,739,948

ION-EXCHANGE RESINS FROM DIVINYL PYRIDINE

Gaetano F. D'Alelio, Pittsburgh, Pa., assignor to Koppers Company, Inc., a corporation of Delaware No Drawing. Application November 21, 1951,
Serial No. 257,660

2 Claims. (Cl. 260—2.1)

This invention relates to new anion-exchange resins. More particularly it relates to the preparation of anion-exchange resins from vinyl-pyridines and related compounds.

Ion-exchange resins have been found desirable for a wide variety of commercial uses. For example, such resins are being used in the purification, deionization, and softening of water, the recovery of magnesium from sea water and brine, the recovery of copper and ammonia from waste cuprammonium solutions in rayon plants, the recovery of amino acid from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

Anion-exchange resins used for some of these purposes are disclosed in applicant's U. S. Patent 2,366,008, which comprise aminated copolymers of mono-vinyl-aromatic compounds and divinyl-aromatic compounds, such as prepared by the nitration of an insoluble, infusible styrene-divinyl benzene copolymer followed by reduction of the nitro groups to amino groups. Other anion-exchange resins which are available comprise phenylene diamine-formaldehyde resins, and the phenol-formaldehyde-diethylenetriamine and triethylene-tetraamine resins, etc. However, the efficiency of these resins is not sufficiently satisfactory for many anion-exchange purposes.

Anion-exchange resins of great utility have now been found which comprise water-insoluble, infusible resins containing the pyridyl nucleus, such as prepared from vinyl-pyridines and vinyl-quinolines and their alkyl and alkenyl derivatives by cross-linking with divinyl-pyridines as described more fully hereinafter. Further, the invention contemplates the water-insoluble, infusible resins prepared by the homo-polymerization of divinyl-pyridines, that is, resins in which the divinyl-pyridine acts as a cross-linking agent for itself; as well as the new divinyl-pyridines. Additional ion-exchange resins embraced herein include the quaternary ammonium-hydroxide form of the divinyl-pyridine homopolymers. Other ion-exchange resins are obtained by the hydrogenation of the divinyl-pyridine homopolymer to the piperidine form followed by quaternization and treatment with caustic to yield the piperidinium hydroxide form of the ion-exchange resin.

The vinyl-pyridines and vinyl-quinolines which may be used in the practice of this invention include 2-vinyl-pyridine, 4-vinyl-pyridine, 3-vinyl-pyridine, 2-vinyl-quinoline, 4-vinyl-quinoline, 6-vinyl-qunoline, as well as their alkyl and alkenyl derivatives, e. g., 2-vinyl-4-methyl-pyridine, 2-vinyl-6-methyl-pyridine, 3-vinyl-6-methyl-pyridine, 3-vinyl-4-methyl-pyridine, 2-vinyl-4,6-dimethyl-pyridine, 2-vinyl-5-ethyl-pyridine, etc.

The inventor has found that for purposes of this invention the nuclear-substituted alkyl and alkenyl derivatives of vinyl-pyridines and vinyl-quinolines, as covered by the followig formula, are equivalents of the vinyl-pyridines and vinyl-quinolines:

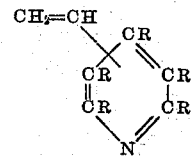

wherein R is hydrogen, alkyl, alkenyl or a divalent hydrocarbon group which forms part of a six-carbon ring by attachment to the R on an adjacent carbon atom of the formula, one of the two carbon atoms which are common to both rings being adjacent to the N of the formula, and one of the R's represents the valence bond by which the vinyl group is attached to the pyridine nucleus.

These vinyl-pyridines and vinyl-quinolines are converted to insoluble, infusible polymers by cross-linking of the vinyl-pyridine or vinyl-quinoline molecules by copolymerization with a divinyl-pyridine. Especially useful for this purpose are 2,6-divinyl-pyridine and 2,4-divinyl-pyridine. These compounds can be prepared, for example, by the dehydration of diethylol- or ethylol-vinyl-pyridines or by the catalytic dehydrogenation of diethyl- or ethyl vinyl-pyridines. This is more fully set out below.

It will be realized, as set forth in my copending application, Serial No. 117,734, now abandoned, of which this application is a continuation-in-part, that these divinyl-pyridines are alkenyl vinyl-pyridines which may themselves be cross-linking agents. That is, anion-exchange resins are obtained by the homopolymerization of a divinyl-pyridine or by copolymerization of mixtures thereof.

The preparation of the divinyl-pyridine is accomplished by the following procedures: one mol. 2,6-lutidine and paraformaldehyde equivalent to 3 mols. formaldehyde is charged into a rotating high pressure bomb and nitrogen is introduced to a pressure of approximately 1000 lbs. p. s. i. The bomb is rotated and heated to a temperature of 150–155° C. for 9 hours, after which the content is fractionally distilled. There is obtained 2,6-diethylol-pyridine, B. P. 165–185° C. at 5 mm. Hg. The 2,6-diethylol-pyridine is dehydrated by dropping it on to heated potassium hydroxide. The potassium hydroxide is placed in a vacuum flask equipped with a condenser and dropping funnel, is heated to approximately 200–225° C. and the diethylol-pyridine added drop by drop from the dropping funnel. The dehydrated diethylol-pyridine steam distills and is condensed together with the water of dehydration in a flask containing tertiary butyl catechol as an inhibitor. Rapid distillation yields a fraction boiling at 170–185° C. which is predominantly 2,6-divinyl-pyridine.

Similarly, starting with 2,4-lutidine and following the above outlined procedure there is obtained a fraction boiling at 185–200° C. which contains a large proportion of 2,4-divinyl-pyridine.

An alternate method for the preparation of 2,4- and 2,6-diethylol pyridines is to dissolve one kilogram lutidine in approximately 2 liters of water. To this is added 1.0 kg. 35–40% formaldehyde solution and the mixture is refluxed for approximately 16 hours. Then steam is introduced until the distillate contains no lutidine or formaldehyde. The water remaining is removed by distillation under reduced pressure at about 50° C. and the residue, crude diethylol-pyridine, is purified by fractional distillation.

A convenient method for the preparation of 2,5-divinylpyridine is to start with the commercially available 2-methyl-5-vinyl-pyridine and to prepare the 2-ethylol-5-vinyl-pyridine by reaction with formaldehyde as described above. Thereafter this compound is dehydrated by dropping it on hot potassium hydroxide and recovering the product as above-described.

Yet another means of producing such compounds as 2,5- and 2,4-divinyl-pyridine is by pyrolysis respectively of 5-ethyl-2-vinyl-pyridine and 4-ethyl-2-vinyl-pyridine according to a procedure analagous to that described in in U. S. 2,385,696 for the production of divinyl-benzene.

The preparation of the various polymers may be best described by the following examples. These examples serve to illustrate various methods of practicing the invention and are not intended as limitations to the scope of the invention. In these examples and throughout the specification "parts" and "per cent" are given in parts and per cent by weight.

*Example I*

Cross-linked copolymers of 2-vinyl-pyridine are made in bead form by suspension polymerization in a pressure-tight autoclave by the following procedure. To the autoclave are added:

0.18 part benzoyl peroxide—dissolved in vinyl-pyridine
0.05 part tert.-butyl perbenzoate dissolved in vinyl-pyridine
90 parts 2-vinyl-pyridine
10 parts 2,4-divinyl-pyridine (obtained as above)
200 parts distilled water
3 parts hydroxy apatite (sub-micronic particle size)
0.03 part sodium oleate The autoclave is then closed and agitated by a rocking mechanism while the autoclave is immersed in a controlled-temperature bath at 90° C. for about 7 hours and then at 113°–115° C. for about 3 hours. The resultant copolymer beads are washed with dilute hydrochloric acid to remove any suspension agent, then with dilute sodium hydroxide to remove adsorbed hydrochloric acid, then with water, and subsequently dried at 70° C. for about two hours.

*Example II*

Ten parts of water-insoluble copolymer beads of Example I are wet with 100 parts of distilled water, and then 200 parts of standardized hydrochloric acid solution are added with shaking. After standing 15 minutes the solution is filtered, and the hydrochloric acid remaining in the filtrate solution is determined by titrating the filtrate with standardized sodium hydroxide solution. The efficiency of the resin is determined by calculating the ratio of chloride ions actually removed from the solution to the chloride ions theoretically removable. These calculations show that the resin has a high capacity for removing chloride ions from the hydrochloric acid solution.

*Example III*

The exhausted resin from Example II is regenerated by treating it with approximately ⅓ N sodium hydroxide solution. After filtering off the sodium hydroxide solution and washing the resin well with distilled water, the anion-exchange resin is retested for its ability to adsorb anions according to the method described in Example I and is found capable of regeneration to a considerable portion of its original efficiency.

*Example IV*

Cross-linked copolymer beads are made by substituting 2-vinyl-quinoline for 2-vinyl-pyridine in the procedure described in Example I. By testing the anion-adsorption efficiency and the regeneration efficiency of these copolymer beads according to the procedures of Examples II and III, the 2-vinyl-quinoline cross-linked copolymer is shown to compare favorably with the 2-vinyl-pyridine copolymers.

In the preceding examples the 2-vinyl-pyridine and the 2-vinyl-quinoline may be replaced by other vinyl-pyridines and vinyl-quinolines, such as mentioned previously or mixtures comprising any number of these compounds. Moreover the pyridine or quinoline compounds may be themselves cross-linking agents, such as alkenyl vinyl-pyridines, alkenyl vinyl-quinolines, diisopropenyl-pyridines, or butadienyl-pyridines, etc. used alone or with the other vinyl-pyridines and vinyl-quinolines or with other copolymerizable ethylenic compounds, such as listed above as will appear more fully in the following examples.

Although the foregoing examples show the use of 10 per cent of a divinyl-pyridine as cross-linking agent for vinyl-pyridines and vinyl-quinolines, it will be understood that other proportions of such cross-linking agents may be used for preparing the water-insoluble polymers, e. g., advantageously at least about 2% of the cross-linking agents may be used. Minor portions of certain other monomers, such as isobutylene, styrene, chlorostyrene, etc. may be used with the pyridine-type compounds and the cross-linking agents. However, these other monomers should not have functional groups which will interfere with the polymerization activities of the monomers or with the ion-exchange activity of the products, or which may be ruptured to give substantial decrease in length of polymer chains or in cross-linking. Similarly, minor portions of such other monomers can be included in a polymerizable composition comprising a divinyl-pyridine or mixtures thereof as described in the following examples. Further, instead of starting with a monomer mixture of the pyridine or quinoline compound and the cross-linking agent, it is also possible to add the cross-linking agent to partial polymers of the pyridine or quinoline compounds and to effect cross-linking by subsequently completing the polymerization.

*Example V*

Following the procedure outlined in Example I but substituting for the 2,4-divinyl-pyridine there used an equimolar quantity of 2,6-divinyl-pyridine, there are obtained cross-linked copolymer beads. By testing the anion-adsorption efficiency and the regeneration efficiency of these copolymer beads according to the procedures of Examples II and III, this cross-linked copolymer is shown to compare favorably with the copolymer of Example I.

*Example VI*

Following the procedure outlined in Example IV but substituting for the 2,4-divinyl-pyridine there used an equimolar quantity of 2,6-divinyl-pyridine, there are obtained cross-linked copolymer beads. By testing the anion-adsorption efficiency and the regeneration efficiency of these copolymer beads according to the procedures of Examples II and III, the 2-vinyl-quinoline cross-linked copolymer is shown to compare favorably with the copolymer of Example IV.

*Example VII*

Following the procedure of Example I but substituting for the 2-vinyl-pyridine there used an equimolar quantity of 4-vinyl-pyridine, there are obtained cross-linked copolymer beads. By testing the anion-adsorption efficiency and the regeneration efficiency of these copolymer beads according to the procedures of Examples II and III, the 4-vinyl-pyridine cross-linked copolymer is shown to compare favorably with the 2-vinyl-pyridine copolymer.

*Example VIII*

A cross-linked, insoluble, infusible homopolymer of 2,4-divinyl-pyridine is prepared by following the procedure outlined above, and substituting for the 2-vinyl-pyridine there used an equimolar quantity of 2,4-divinyl-pyridine. By testing the anion-adsorption efficiency and the regeneration efficiency of this homopolymer according to the procedures of Examples II and III, the 2,4-divinylpyridine cross-linked homopolymer is shown to compare favorably with the copolymer of Example I.

Similarly, when 2,6-divinyl-pyridine is substituted in the foregoing procedure, there is obtained an insoluble, infusible homopolymer which, when subjected to the above-described tests, exhibits properties substantially similar to those of the 2,4-divinyl-pyridine homopolymer.

*Example IX*

Following the procedure outlined in Example I but substituting for the monomers there used a mixture comprised of equal parts of 2,4- and 2,6-divinyl-pyridine, there is obtained an insoluble, infusible, cross-linked copolymer having properties substantially similar to those of the resins of Example VIII.

*Example X*

The cross-linked, insoluble, infusible homopolymer of Example VIII is exhaustively ethylated by treatment with ethyl iodide at reflux temperature using a molar excess of ethyl iodide. The excess (or unreacted) ethyl iodide is removed by heating the reaction mixture to approximately 50° C. in an open vessel. If desired, the alkyl halide can be removed by washing the resin with a small quantity of a volatile organic solvent such as diethyl ether. The resin which is in the ethyl pyridinium iodide form upon treatment with caustic yields the pyridinium hydroxide form of the resin. This resin when tested according to the procedure outlined in Examples II and III gives excellent results.

*Example XI*

The cross-linked, insoluble, infusible homopolymer of Example VIII is suspended in anhydrous methyl alcohol and hydrogenated at 150° C. in the presence of a platinized asbestos catalyst. There is obtained the piperidinium form of the resin. Following the procedure involving exhaustive ethylation and treatment with caustic described in Example X, there is obtained the piperidinium hydroxide form of the ion-exchange resin. This resin when tested according to the procedure outlined in Examples II and III give excellent results. In the foregoing procedure, also used in Example X, there can be substituted for the ethyl iodide there used any alkyl halide conventionally used in quaternization reactions. Similarly, aralkyl halides are the equivalent of alkyl halides in the quaternization reaction.

The cross-linked copolymers suitable for the practice of this invention can be prepared by any method which will give infusible, insoluble resins, for example, by mass, solution, emulsion and suspension polymerization. The polymerizations may be advantageously catalyzed by various types of catalysts, such as peroxides, e. g. benzoyl, hydrogen, acetyl, acetylbenzoyl, phthalyl, lauroyl peroxides, tert-butylhydroperoxide, etc.; and other per-compounds, e. g., ammonium persulfate, sodium persulfate, sodium perchlorate, etc.

Anions which may be removed from solution by the insoluble polymers of this invention, in addition to the chloride anions mentioned in the examples, include nitrate ions, sulfate ions, acetate ions, oxalate ions, tartrate ions, or any other anions which will react with the basic pyridine or quinoline groups in the resin to form salts. These anion-exchange resins can be readily regenerated by washing with a dilute alkali solution, preferably of an alkali-metal hydroxide which forms soluble salts with the adsorbed anions.

Inert material, such as diatomaceous earth, alundum, coke, silica, cinders, porous glass, etc., may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

While there are above disclosed but a limited number of embodiments of the invention, it is possible to produce still other embodiments without departing from the inventive concept herein disclosed; and it is, therefore, desired that only such limitations be imposed upon the appended claims as are stated therein or required by the prior art.

I claim:

1. Homopolymeric N-alkyl divinylpyridinium hydroxide.

2. Homopolymeric N,N-dialkyl divinylpiperidinium hydroxide.

References Cited in the file of this patent

UNITED STATES PATENTS

| | | |
|---|---|---|
| 2,247,266 | Wibaut et al. | June 24, 1941 |
| 2,299,782 | Allen et al. | Oct. 27, 1942 |
| 2,366,008 | D'Alelio | Dec. 26, 1944 |
| 2,484,430 | Sprague | Oct. 11, 1949 |
| 2,491,472 | Harmon | Dec. 20, 1949 |
| 2,503,209 | Nyquist | Apr. 4, 1950 |
| 2,534,285 | Mahan | Dec. 19, 1950 |
| 2,540,984 | Jackson | Feb. 6, 1951 |
| 2,540,985 | Jackson | Feb. 6, 1951 |
| 2,559,529 | Bauman | July 3, 1951 |
| 2,631,993 | Morgan | Mar. 17, 1953 |
| 2,677,688 | Burrows et al. | May 4, 1954 |
| 2,688,009 | Crouch et al. | Aug. 31, 1954 |